United States Patent [19]

Breunig et al.

[11] Patent Number: 5,339,651
[45] Date of Patent: Aug. 23, 1994

[54] METHOD AND APPARATUS FOR SURFACE FREEZING FOLLOWED BY COMPLETE FREEZING OF MEAT PRODUCTS

[75] Inventors: Timothy A. Breunig, Hutchinson; Gregory A. Roepka, S. Hutchinson, both of Kans.

[73] Assignee: Mega Manufacturing, Inc., Hutchinson, Kans.

[21] Appl. No.: 5,596

[22] Filed: Jan. 19, 1993

[51] Int. Cl.⁵ .............................. F25C 1/00
[52] U.S. Cl. .......................... 62/65; 62/332; 62/346; 62/381
[58] Field of Search ............. 62/63, 65, 374, 381, 62/346, 332

[56] References Cited

U.S. PATENT DOCUMENTS

| | | | |
|---|---|---|---|
| 3,048,987 | 8/1962 | Wentworth | 62/346 |
| 3,611,745 | 10/1971 | Schlemmer | 62/333 |
| 3,664,146 | 5/1972 | Butts | 62/63 |
| 3,774,409 | 11/1973 | Persson et al. | 62/346 |
| 3,791,162 | 2/1974 | Baker | 62/341 |
| 3,982,404 | 9/1976 | Overbye | 62/65 |
| 4,205,536 | 6/1980 | Kasahara | 62/380 |
| 4,856,285 | 8/1989 | Acharya et al. | 62/63 |
| 5,156,008 | 10/1992 | Olsson et al. | 62/63 |
| 5,168,723 | 12/1992 | Kiczek et al. | 62/381 |
| 5,220,803 | 6/1993 | Kiczek | 62/381 |

FOREIGN PATENT DOCUMENTS 87025939 6/1987 Sweden.
1441846 12/1973 United Kingdom.

*Primary Examiner*—Ronald C. Capossela
*Attorney, Agent, or Firm*—Shook, Hardy & Bacon

[57] ABSTRACT

An apparatus and method is provided for initially freezing a first exterior surface of a product such as a food product. The product is then supported on a perforated conveyor belt with the frozen first exterior surface in contact with the conveyor belt. The product is then further frozen and processed. Because the frozen surface of the product is hard, it does not conform to the surface contours of the belt and the unmarred visual appearance of the product is maintained. In addition, the frozen surface of the product is more easily removed from the belt after complete freezing and damage to the product is less likely to occur during removal of the belt.

9 Claims, 2 Drawing Sheets

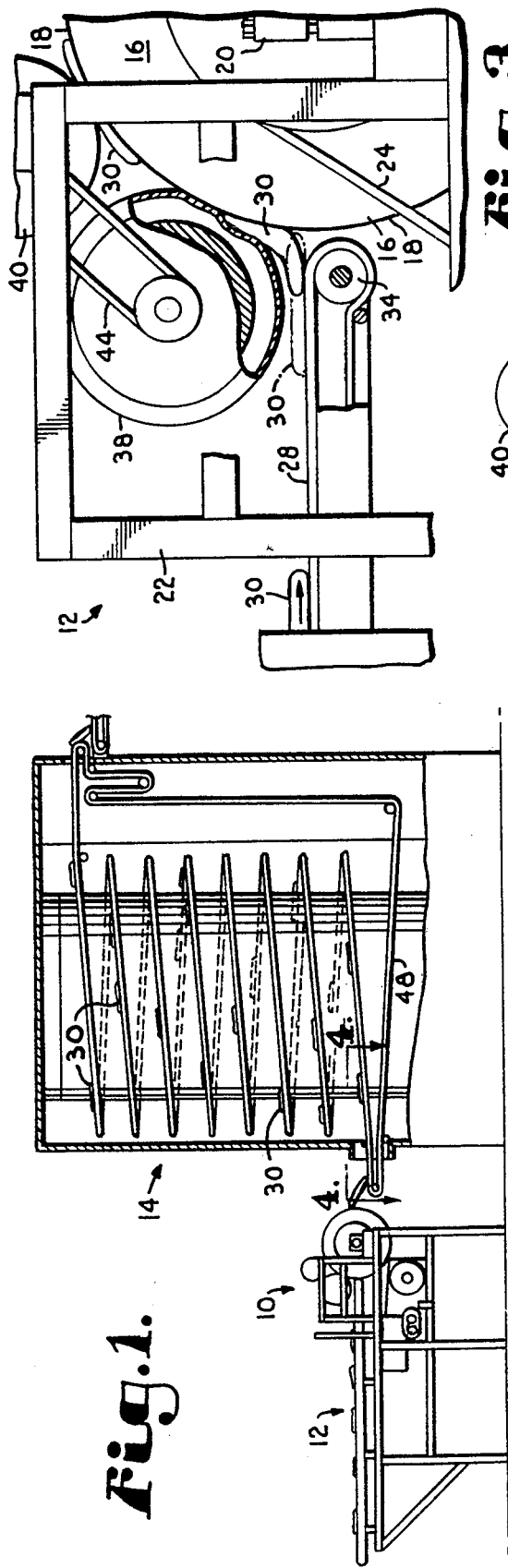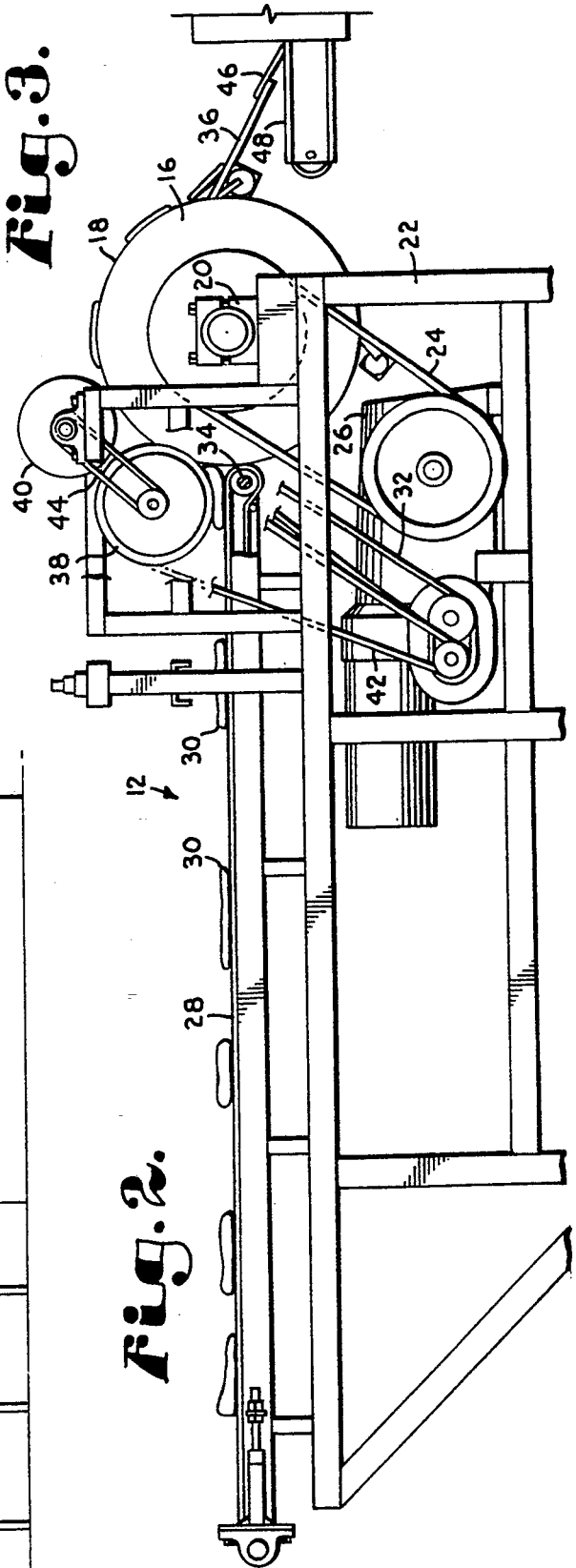

METHOD AND APPARATUS FOR SURFACE FREEZING FOLLOWED BY COMPLETE FREEZING OF MEAT PRODUCTS

BACKGROUND OF THE INVENTION

This invention relates in general to the preparation of products and, more particularly, to a method and apparatus for freezing products such as foods.

Many types of food products are frozen and then packaged as part of the process for preparing the food for distribution. This type of preparation is desirable because it extends the shelf life and freshness of the food beyond that which can normally be obtained if the food is maintained at room temperature. Equipment used for freezing the food products can include drum or wheel freezers having a low temperature outer surface. The food products are placed on the smooth exterior surface of the rotating drum and undergo heat exchange which causes freezing of the food products. The frozen products are then scraped off of or otherwise removed from the drum surface for packaging.

Another type of equipment frequently used in the freezing of food products is a spiral freezer that utilizes an endless conveyor belt to carry the food in a spiral path through a low temperature compartment. The conveyor belt utilized in spiral freezers typically comprises an open wire mesh which allows air to circulate through the belt to provide uniform temperature distribution around the product.

A notable problem that has developed in the freezing of many types of products is the tendency of the frozen food or other product to adhere to the belt on which it is conveyed. This problem is particularly acute in the processing of foods which contain moisture, such as chickens and other meats, because the moisture freezes to the belt. In those applications where a smooth solid belt is utilized, the frozen product can normally be removed from the belt without damaging the product. In many applications, such as in a spiral-type freezer, the belt must be of an open mesh construction to allow the cooled air to circulate through the belt to ensure uniform cooling of the product. In such applications, the moisture in the product is able to enter and freeze within the mesh openings of the belt. The frozen product can thus be difficult to remove from the belt without being damaged. If the product should be damaged, it must often be discarded or sold as a lesser grade of quality.

Another problem resulting from the use of open weave or mesh belts is the tendency of the surface of the product to conform to the surface of the belt as the product is supported thereon prior to freezing. Once the product becomes frozen, the surface markings formed in the product become solidified. While the product is not necessarily damaged by the markings formed in this manner, the visual appearance of the product may be unsatisfactory.

As a result of the damage that can result to the food or other product when mesh or otherwise perforate belts are utilized, freezers employing such belts have proven to be unsuitable for many types of food preparation processes. A need has thus arisen for an apparatus and method for reducing the incidence of food and other products freezing to the conveyor belt during the freezing process.

SUMMARY OF THE INVENTION

It is an object of this invention to provide a method for freezing products, particularly food products, in a manner that reduces the opportunity for moisture from the product to adhere tightly to the conveyor belt and thus cause damage to the product during attempted removal of the product from the conveyor belt.

It is also an object of this invention to provide a method in which only an exterior surface of the food product is initially frozen so that this frozen surface is less likely to adhere to mesh or otherwise perforated Conveyors during subsequent freezing of the entire food product.

As a corollary to the preceding object, it is another objective of this invention to support the food product on a smooth imperforate surface during the initial freezing of the exterior surface so that the product can then be easily removed from the imperforate surface without damaging the product.

It is another object of this invention to provide a method for freezing food products which initially freezes an exterior surface of the product so that it can be subsequently supported on the frozen exterior surface during further freezing of the entire product without causing markings to be formed on the exterior portion of the product which is in contact with the underlying surface.

It is a further object of this invention to provide an apparatus which utilizes a freeze drum to initially freeze a surface of a food product and then completes the freezing process utilizing another freezing apparatus employing a mesh or otherwise perforated conveyor belt so that the product is less likely to adhere to the mesh conveyor and be damaged during removal therefrom.

To accomplish these and other related objects, in one aspect the invention is directed to a method for freezing a food product, said method comprising the steps of:
  freezing a first exterior surface of a food product by placing the first exterior surface in contact with a low temperature surface;
  removing the food product from the low temperature surface;
  supporting the food product on a conveyor belt with the frozen first exterior surface of the food product in contact with a surface of the conveyor belt; and
  further freezing said food product while the food product is supported on the conveyer belt with the frozen first exterior surface in contact with the surface of the conveyor belt.

The step of supporting the food product also encompasses the step of supporting the food product on an open mesh or otherwise perforate conveyor belt.

In another aspect, the invention is directed to an apparatus comprising an apparatus for freezing products, said apparatus comprising:
  a first freezer having a smooth surface adapted for receiving a product and causing cooling of a first exterior surface thereof to a low temperature;
  a second freezer having a perforate conveyor that moves through the second freezer, said second freezer being operatively coupled with the first freezer for receiving the product therefrom and supporting the product on the perforate conveyor with the cooled first exterior surface of the product in contact with a surface of the conveyor, said second freezer being adapted to cause freezing of the product.

In a preferred embodiment, the first freezer comprises a rotatable drum and said smooth surface comprises an exterior surface of the drum.

BRIEF DESCRIPTION OF THE DRAWINGS

In the drawings which form a part of the specification and are to be read in conjunction therewith and in which like reference numerals are used to denote like parts in the various views:

FIG. 1 is a side elevational view, shown somewhat schematically, of an apparatus constructed in accordance with the present invention for initially freezing a surface of a food product and subsequently completing the freezing of the food product;

FIG. 2 is an enlarged side elevational view of a first freezing apparatus of the type shown in FIG. 1 for freezing a first exterior surface of the food product;

FIG. 3 is a further enlarged side elevational view of a fragmental portion of the first freezing apparatus with portions broken away to illustrate the transfer of product from a conveyor belt to a rotating drum.

DESCRIPTION OF THE PREFERRED EMBODIMENT

Figure 4:
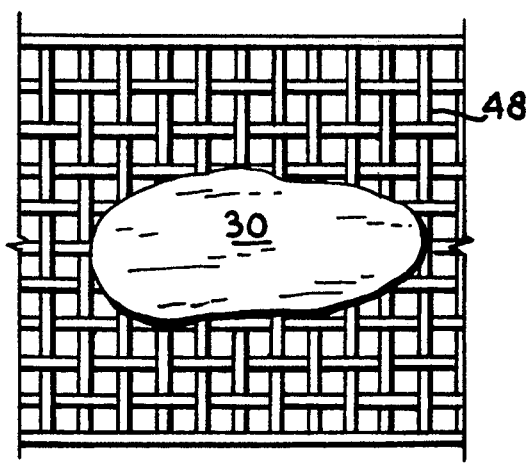
FIG. 4 is a fragmentary top plan view of a food product supported on an open weave belt that is used to convey the food product within a second freezer of the type shown in FIG. 1.

Turning now to the drawings in greater detail and initially to FIG. 1, a freezing apparatus in accordance with the present invention is represented broadly by the numeral 10. Freezing apparatus 10 comprises a first freezer 12 that is utilized to freeze an outer surface of a product such as food carried thereon and a second freezer 14 that subsequently causes complete freezing of the entire product.

First freezer 12 may comprise any of various suitable freezers having a smooth surface capable of causing freezing of the exterior of the food or other product. Turning more specifically to FIGS. 2 and 3, in a preferred embodiment freezer 12 comprises a drum freezer comprising a rotatable drum 16 that has a smooth exterior surface 18 which is cooled to the desired temperature by a suitable refrigerant circulating within the drum 16. Freeze drums of this type are well known to those skilled in the art and need not be described in detail herein. One example of a particularly preferred freezer is disclosed in pending U.S. Pat. No. 5,187,947 entitled "Wheel Type Freezer and Method for Rapid Low Temperature Freezing" which is incorporated herein by reference in its entirety.

The drum 16 is supported for rotation about a horizontal axis by bearings 20 mounted on a suitable frame 22. The drum 16 is rotated in a clockwise direction as viewed in the drawings by a drive belt 24 coupled with a motor 26.

A first endless conveyor belt 28 is also supported on frame 22 and is positioned to carry a series of product 30 from a preliminary processing area to the rotating drum 16. The belt 28 can be driven in any suitable fashion such as by a drive belt 32 turning an end roller 34. The end roller 34 is closely spaced to the drum 16 so that the conveyor belt 28 can deliver the product 30 directly onto the drum 16. The product 30 is then carried through a preselected arc of travel on the exterior surface 18 of the rotating drum 16. A suitable scraper 36 is positioned adjacent the drum 16 at the desired position to remove the product 30 from the drum exterior surface 18 after it has traveled through the preselected arc.

A series of rollers 38 and 40 are provided adjacent the drum 16 and serve to urge the product 30 against the exterior surface 18 of drum 16. The rollers 38 and 40 can be inflatable bladder type rollers or can be hard rollers that give a controlled thickness to the product 30. Roller 38 is driven by a primary drive belt 42, and a secondary drive belt 44 connects roller 40 to roller 38 for rotation therewith. Each of rollers 38 and 40 and end roller 34 are preferably driven by the same motor 26 that drives the drum 16, although this need not necessarily be the case.

It can thus be seen that the first freezer 12 can be utilized to cause freezing of the exterior portion of product 30 which is in contact with the low temperature drum 16. In preferred applications, the product 30 is a food product, such as poultry or other types of meats, that requires freezing for extended shelf life.

The product 30 which has a frozen exterior surface is then directed by a suitable chute 46 from the drum 16 to a second endless conveyor 48 that extends within the second freezer 14. The second freezer 14 is designed to complete the freezing of the product 30 and may comprise any of various types of freezers that are suitable for such purpose. The present invention has particular applicability when the second freezer 14 is one in which the conveyor belt 48 contains perforations to facilitate the uniform distribution of conditioned air or other fluid around the product 30. The use of such perforated belts 48, such as the open weave belt illustrated in FIG. 4, would normally cause the surface of the product 30 in contact with the belt 48 to deform and assume the contour of the belt. When the product 30 is then frozen, the irregular undersurface is solidified and the product may have an unsuitable appearance. In addition, the presence of moisture associated with the product 30 may cause the product to tightly adhere to the belt 48 when the moisture freezes. Subsequent removal of the product from the belt may then cause the product to be damaged and reduce the value thereof. The present invention overcomes the problems associated with such perforated belts by causing the surface of the product 30 which contacts the belt 48 to be frozen before the product is placed on the belt. This prevents the product 30 from being marked by the belt 48 and prevents the product 30 from being damaged during removal from the belt 48.

In the illustrated embodiment, the second freezer 14 comprises a spiral freezer in which the conveyor belt 48 enters at a bottom portion thereof and travels in an upward spiral arrangement. The conveyor belt 48 supports the product 30 and carries it along its path of travel within the freezer 14 to cause complete freezing of the product 30. The conveyor belt 48 then exits the freezer 14 near the top thereof and delivers the frozen product 30 to another conveyor 50 for packaging or further processing.

Although the invention has been described with reference to a spiral freezer 14, it will be appreciated that the invention has applicability to other types of freezers which utilize a conveyor belt 48 having surface discontinuities in the form of perforations or irregularities. For example, tunnel type freezers could be utilized for second freezer 14. Alternatively, drum freezers that position the product during freezing between a conveyor belt and the exterior surface of the drum could be utilized.

It can thus be seen that the method and apparatus of the present invention reduce or eliminate the marking of food and other type products 30 during freezing by freezing and thus solidifying the surface of the product 30 before it is placed in contact with the conveyor belt 48. The freezing of the product surface also causes any moisture associated with that surface to freeze and thereby prevents it from subsequently freezing and adhering the product 30 to belt 48. This greatly facilitates removal of the product 30 from the belt 48 and reduces the opportunity for the product 30 to be damaged during such removal.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A method for freezing a food product having a first exterior surface and a second exterior surface located opposite said first exterior surface, said method comprising the steps of:
   freezing a first exterior surface of a food product by placing the first exterior surface in contact with a low temperature surface of a rotating wheel or drum type freezer;
   removing the food product from the low temperature surface following the freezing of the first exterior surface and prior to the freezing of the second exterior surface;
   supporting the food product on a conveyor belt with the frozen first exterior surface of the food product in contact with an upper surface of the conveyor belt; and
   further freezing said food product while the food product is supported on the conveyor belt with the frozen first exterior surface in contact with the upper surface of the conveyor belt.

2. The method for freezing a food product as set forth in claim 1, wherein the step of supporting the food product comprises the step of supporting the food product on a perforate conveyor belt.

3. The method for freezing a food product as set forth in claim 1, wherein the step of supporting the food product comprises the step of supporting the food product on an open mesh conveyor belt.

4. The method for freezing a food product as set forth in claim 3, wherein said step of further freezing the food product comprises the step of conveying the food product through a freezer along a spiral path of travel.

5. An apparatus for freezing products, said apparatus comprising:
   a first freezer comprising a rotatable drum having a smooth surface adapted for receiving a product and causing cooling of a first exterior surface thereof to a low temperature;
   a second freezer having a perforate conveyor that moves through the second freezer, said second freezer being operatively coupled with the first freezer for receiving the product therefrom and supporting the product on the perforate conveyor with the cooled first exterior surface of the product in contact with a surface of the conveyor, said second freezer being adapted to cause complete freezing of the product.

6. The apparatus as set forth in claim 5, including a conveyor for directing the product onto the rotatable drum.

7. The apparatus as set forth in claim 6, including rollers spaced from the exterior surface of the drum for urging the product against the exterior surface of the drum.

8. The apparatus as set forth in claim 7, wherein the perforate conveyor moves through the second freezer in a spiral path of travel.

9. The apparatus as set forth in claim 8, including a conveyor for directing the product from the drum to the second freezer.

* * * * *